(12) United States Patent
Gottlieb

(10) Patent No.: US 11,477,949 B1
(45) Date of Patent: Oct. 25, 2022

(54) CLIMATE BLANKET

(71) Applicant: Milton Gottlieb, North Miami Beach, FL (US)

(72) Inventor: Milton Gottlieb, North Miami Beach, FL (US)

(*) Notice: Subject to any disclaimer, the term of this patent is extended or adjusted under 35 U.S.C. 154(b) by 0 days.

(21) Appl. No.: 17/865,179

(22) Filed: Jul. 14, 2022

Related U.S. Application Data

(63) Continuation-in-part of application No. 17/674,275, filed on Feb. 17, 2022.

(51) Int. Cl.
  *A01G 15/00* (2006.01)
  *B63B 35/00* (2020.01)
  *E02B 3/00* (2006.01)
  *B63B 35/38* (2006.01)
  *B63B 22/00* (2006.01)

(52) U.S. Cl.
  CPC ............. *A01G 15/00* (2013.01); *B63B 22/00* (2013.01); *B63B 35/00* (2013.01); *B63B 35/38* (2013.01); *E02B 3/00* (2013.01)

(58) Field of Classification Search
  CPC .. A01G 15/00; B63B 22/00; B63B 2022/006; B63B 22/04; B63B 2029/022; B63B 35/38; B63B 2035/4493; B63B 35/53; B63B 35/58; B65D 88/34; B65D 88/36; E02B 3/00; E02B 3/062; E02B 3/064; E04H 4/08; E04H 4/082; F24S 10/17
  See application file for complete search history.

(56) References Cited

U.S. PATENT DOCUMENTS

| | | | | |
|---|---|---|---|---|
| 3,824,644 | A * | 7/1974 | Stranzinger | B63B 35/38 14/27 |
| 5,188,550 | A * | 2/1993 | Oliver | F24S 10/17 126/567 |
| 6,745,714 | B1 * | 6/2004 | Faber | B63B 3/08 114/263 |
| 8,256,988 | B1 * | 9/2012 | Haber | E02B 3/062 405/27 |
| 10,701,871 | B2 * | 7/2020 | Field | A01G 15/00 |
| 2018/0023264 | A1 * | 1/2018 | Sainudeen | E02B 3/062 405/27 |

* cited by examiner

*Primary Examiner* — Ajay Vasudeva
(74) *Attorney, Agent, or Firm* — David W Barman

(57) ABSTRACT

The present invention is a deployable climate blanket system for regulating temperature of a water surface, including two or more climate blanket secured one to another, each blanket configured with an interior air-filled cavity and a plurality of weights for maintaining the system into a desired position. When use of the blankets is no longer desired, the blankets can be lowered beneath the water surface so as not to interfere with boat traffic or other surface use of the water.

16 Claims, 4 Drawing Sheets

CLIMATE BLANKET

INDEX TO RELATED APPLICATIONS

This application is a continuation in part of U.S. patent application Ser. No. 17/674,275 filed Feb. 17, 2022, the disclosure of which is incorporated herein by reference in its entirety.

BACKGROUND OF THE INVENTION

It is generally known that the hurricane season in the Atlantic Ocean runs from June 1 to November 30 each year. Hurricanes form east of the African coast and west of the Cape Verde islands and usually require ocean water warmer than 79.7° F. in order to form. Despite many technological advances, in forecasting and modeling, modern science has been able to provide little to no relief from the formation and devastating effects of hurricanes. In other parts of the world,—North Pacific, South Pacific and Indian Oceans— the same principles would apply to hurricanes of those regions which are known as cyclones and typhoons.

The present invention addresses this issue.

SUMMARY OF THE INVENTION

The present invention is suitable as a climate control blanket system not only for private fish farm operators but on a larger scale to influence water temperature in an area where hurricanes are spawned and prevent or minimize rising water vapors from coming into contact with the air above. In one embodiment, the climate blanket of the present invention is configured much like a mattress with lead weights attached on the bottom surface at each corner at regular intervals. Bottom surface, as generally understood in the present invention means that surface facing downward into the water. One embodiment, each individual blanket is configured with connecting tabs on the side such that two or more blankets are attached one to another in order to cover a desired area.

It is contemplated that in an environment of use, a user will prepare a plurality of blankets according to the present invention and pump air into an interior cavity until each individual blanket floats on the surface of the water. When use of the blankets are no longer desired, a user will draw out the air and lower the blankets beneath the surface of the water so as not to interfere with boat traffic or other surface use of water.

In one embodiment, the present invention will provide that each air hose should be connected to one or more climate blankets and the other end of one or more air hoses should be attached to a buoy floating on the surface and easily accessible.

In one environment, operators of fish farms utilize the system of the present invention to regulate water temperatures in their facilities.

In one embodiment, the invention is a climate blanket system comprising:
two or more climate blankets, said blankets comprising a main body; a plurality of weights permanently attached to said main body; an interior cavity constructed and arranged to receive and hold air, wherein said main body is accessed through at least one hose configured to fill air into said main cavity and to expel air from said main cavity as desired; a plurality of connectors positioned about the perimeter of each of said climate blankets;
a buoy attached to said climate blanket in order to moor and maintain the climate blanket on or near a water surface in which said climate blanket is deployed;
a communications system configured for receiving information from existing weather, climate, and positioning systems including at least one of surface water temperature, air temperature, localized climate, geographic position, or combinations thereof, said system further configured for output communications of said information received to a user; and
a user interface on a microprocessor configured to receive said output information from said communications system and further processing said output information relating to an effect of said system on said water surface in which said system is deployed.

In one embodiment, the blankets have an upper surface and lower surface, wherein said lower surface is facing the bottom of a body of water onto which said system is deployed.

In one embodiment, the blankets have an upper surface and lower surface, wherein said lower surface is facing the bottom of a body of water onto which said system is deployed and said weights are affixed to said bottom surface.

In one embodiment, the interior cavity includes a fill valve.

In one embodiment, the interior cavity includes a fill valve configured to fill or expel air from said cavity as selected by a user.

In one embodiment, the plurality of connectors includes two connectors on each edge of said blankets.

In one embodiment, the plurality of connectors includes a connector pin configured for securing connectors of different blankets one to another.

In one embodiment, the buoy includes at least two buoys.

In one embodiment, the invention is a climate blanket system consisting of:
two or more climate blankets, said blankets comprising a main body; a plurality of weights permanently attached to said main body; an interior cavity constructed and arranged to receive and hold air, wherein said main body is accessed through at least one hose configured to fill air into said main cavity and to expel air from said main cavity as desired, the interior cavity includes a fill valve configured to fill or expel air from said cavity as selected by a user; a plurality of connectors positioned about the perimeter of each of said climate blankets;
a buoy;
a communications system a satellite configured to measure and communicate surface water temperature, air temperature, localized climate, geographic position, or combinations thereof; and
a user interface configured to receive information from said communications system; wherein, the blankets have an upper surface and lower surface, said lower surface is facing the bottom of a body of water onto which said system is deployed.

In one embodiment, the blankets have an upper surface and lower surface, wherein said lower surface is facing the bottom of a body of water onto which said system is deployed and said weights are affixed to said bottom surface.

In one embodiment, the plurality of connectors includes two connectors on each edge of said blankets.

In one embodiment, the plurality of connectors includes a connector pin configured for securing connectors of different blankets one to another.

In one embodiment, the buoy includes at least two buoys.

In one embodiment, the invention is a climate blanket system consisting of:
- two or more climate blankets, said blankets comprising a main body; a plurality of weights permanently attached to said main body; an interior cavity constructed and arranged to receive and hold air, wherein said main body is accessed through at least one hose configured to fill air into said main cavity and to expel air from said main cavity as desired; a plurality of connectors positioned about the perimeter of each of said climate blankets;
- a buoy attached to said climate blanket in order to moor and maintain the climate blanket on or near a water surface in which said climate blanket is deployed;
- a communications system configured for receiving information from existing weather, climate, and positioning systems including at least one of surface water temperature, air temperature, localized climate, geographic position, or combinations thereof, said system further configured for output communications of said information received to a user; and
- a user interface on a microprocessor configured to receive said output information from said communications system and further processing said output information relating to an effect of said system on said water surface in which said system is deployed.

In one embodiment, where the system does not include weights, the blankets have an upper surface and lower surface, wherein said lower surface is facing the bottom of a body of water onto which said system is deployed.

In one embodiment, where the system does not include weights, the interior cavity includes a fill valve.

In one embodiment, where the system does not include weights, the interior cavity includes a fill valve configured to fill or expel air from said cavity as selected by a user.

In one embodiment, where the system does not include weights, the plurality of connectors includes two connectors on each edge of said blankets.

In one embodiment, where the system does not include weights, the plurality of connectors includes a connector pin configured for securing connectors of different blankets one to another.

In one embodiment, where the system does not include weights, the buoy includes at least two buoys.

DETAILED DESCRIPTION OF THE PREFERRED EMBODIMENTS

Figure 1:
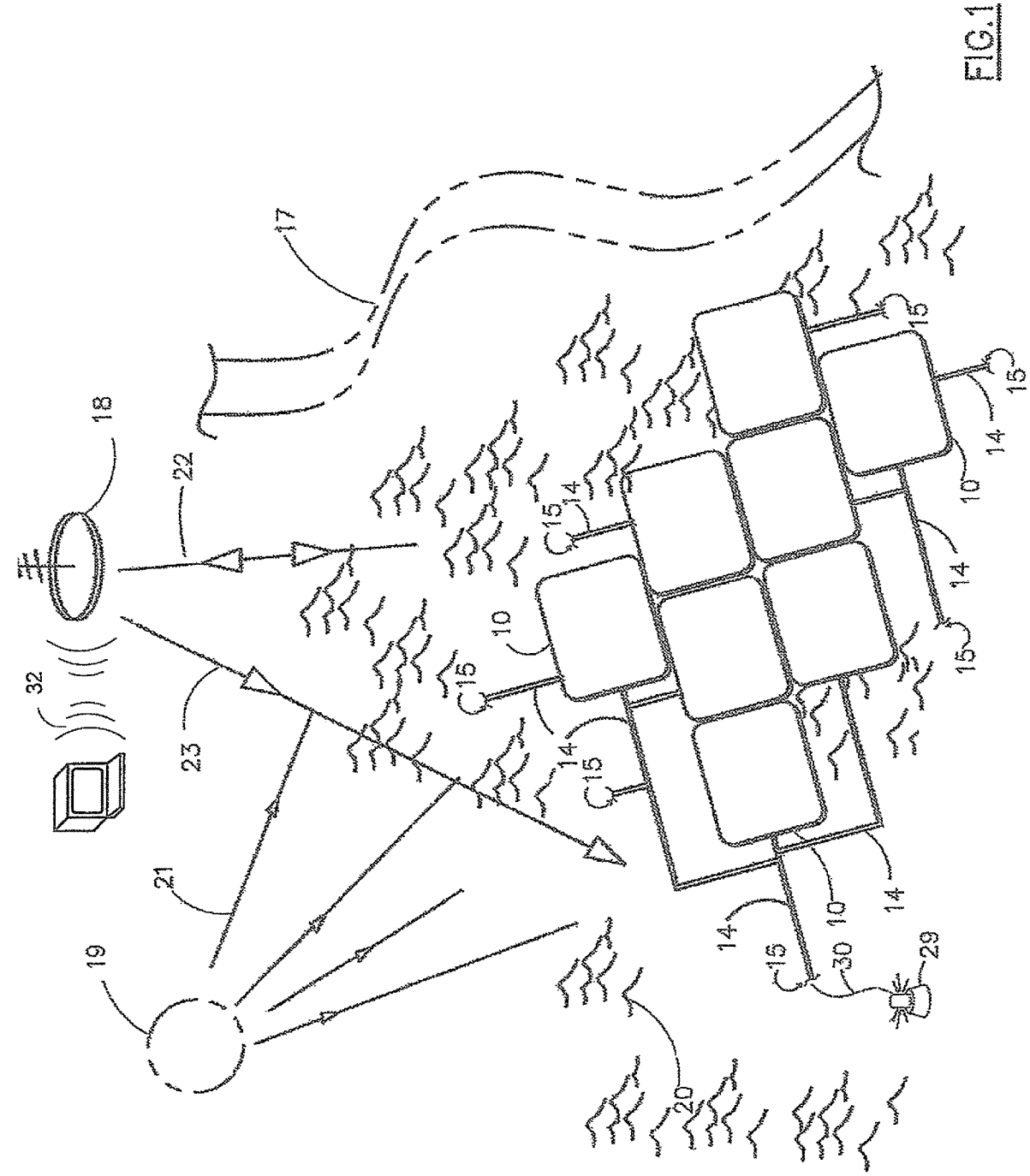
FIG. 1 is a climate blanket system according to one embodiment of the present invention.
Figure 2:
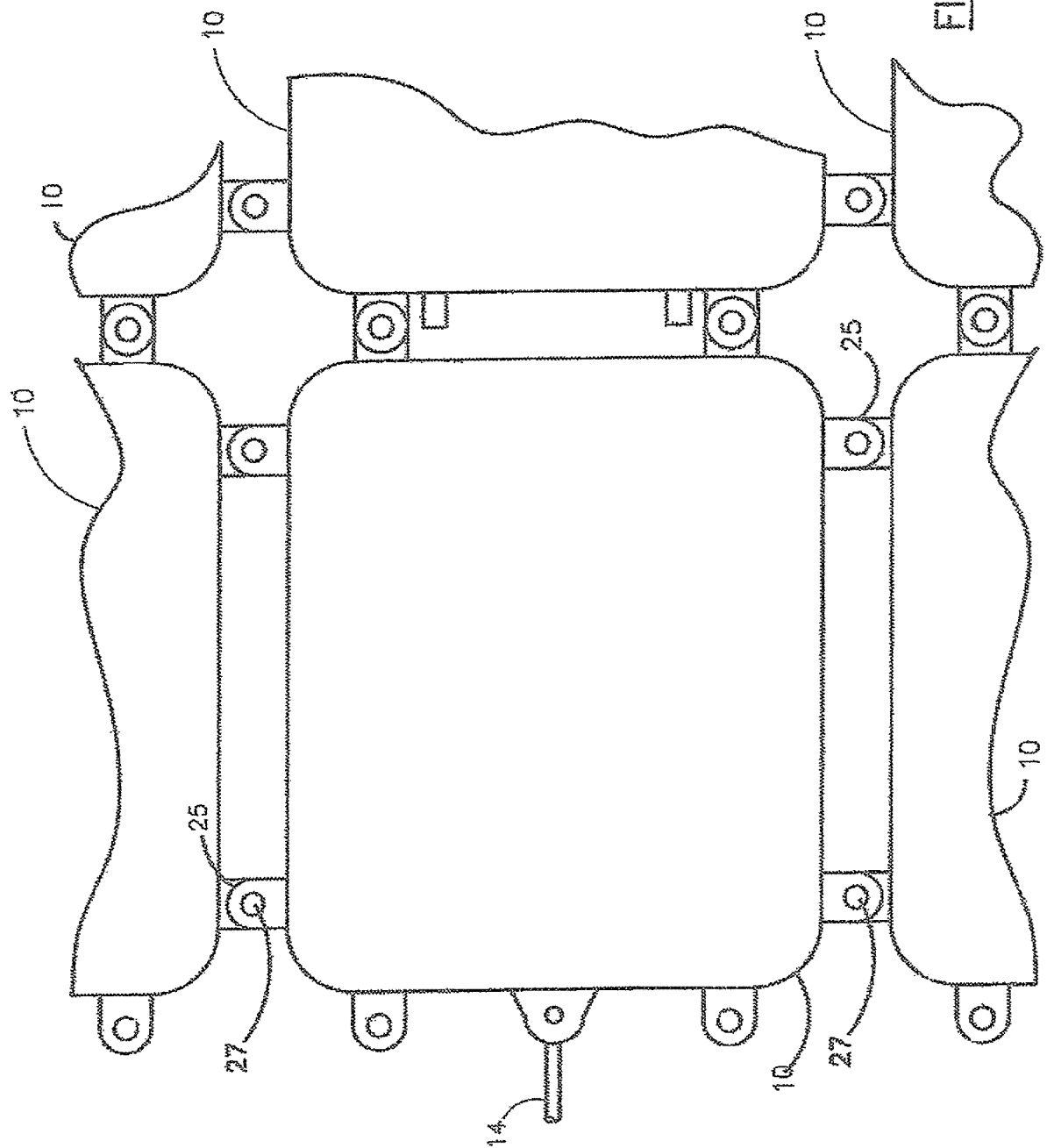
FIG. 2 is a top view of a climate blanket system according to one embodiment of the present invention.
Figure 3:
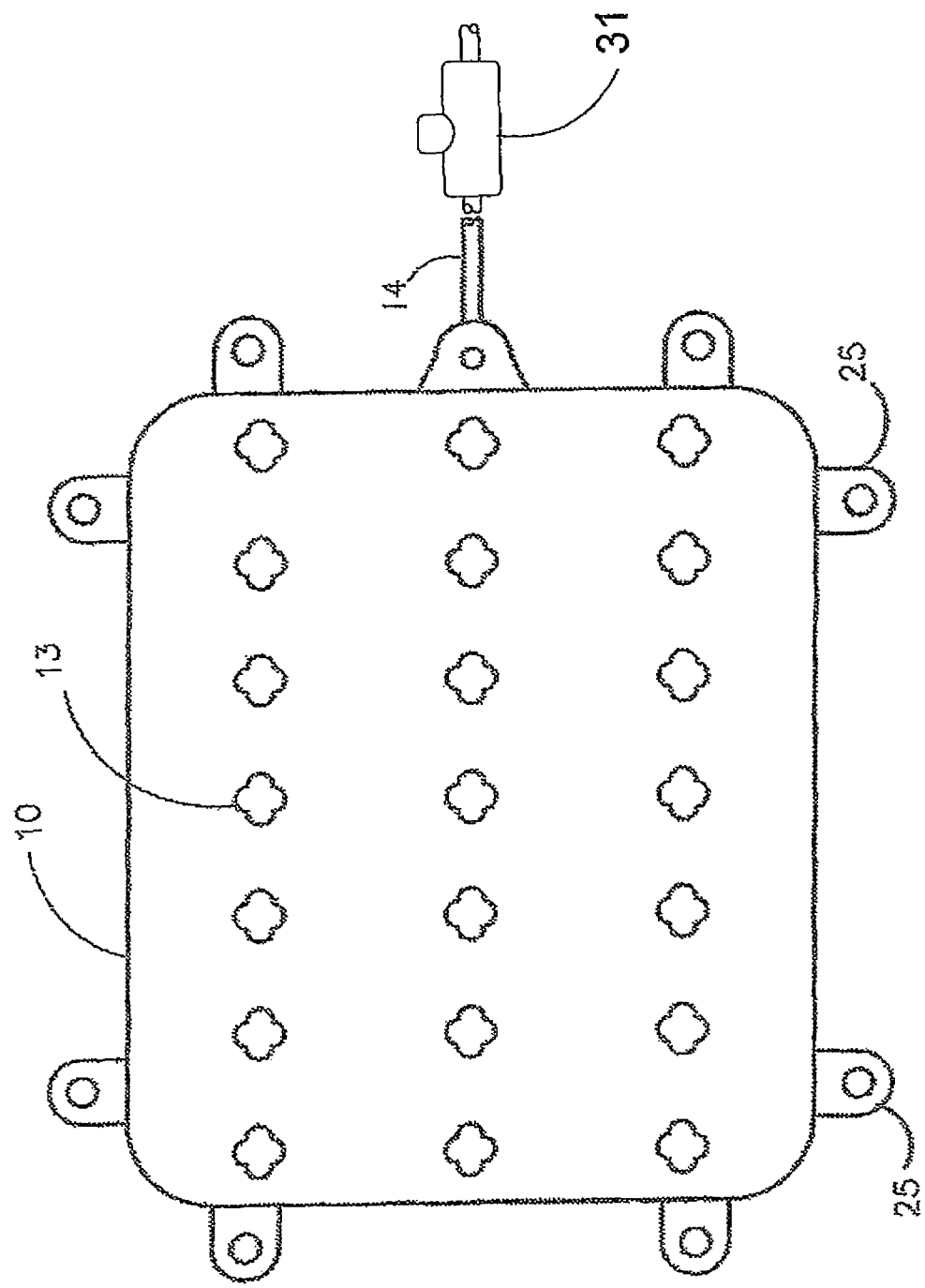
FIG. 3 is a bottom view of a single climate blanket and anchors according to one embodiment of the present invention.
Figure 4:
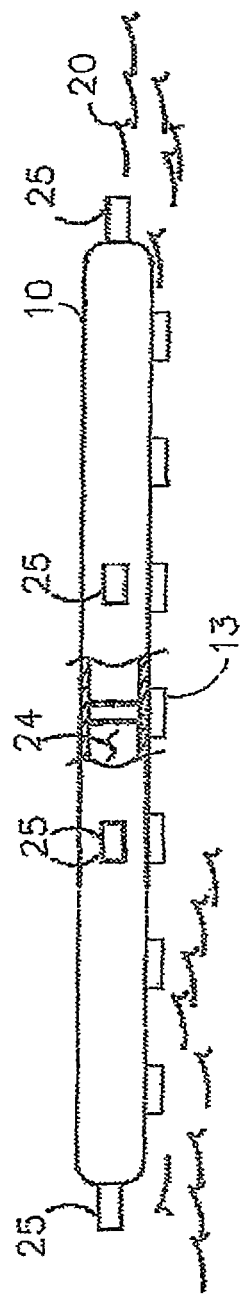
FIG. 4 is a side view of a single climate blanket in a deployed position according to one embodiment of the present invention.

As generally understood by the figures, system 5, includes a plurality of climate blankets 10. Each blanket is constructed and arranged with a plurality of weights 13, that functions as an anchor and or stabilizer and to remove the blanket from the surface. Each of weights 13 are permanently secured to the body of climate blanket 10. Each climate blanket 10 is constructed and arranged with at least one pneumatic hose 14 that leads to interior air cavity 24 within blanket 10. Pneumatic hose 14 is constructed and arranged to introduce air into interior air cavity 24 and to evacuate air as desired.

Pneumatic array 15 is a plurality of pneumatic hoses 14 used in the system of the present invention. The system of the present invention further contemplates using a satellite 18 constructing an arranged to provide information including but not limited to climate information, geographic position, water temperature, or combinations thereof. If an environmental satellite is not available, a temperature gun can be used.

As generally understood, the system at the present invention is placed on a body of water 20 away from the geographic shoreline 17. When the Sun 19 radiates heat 21 onto water 20 information exchange 23 occurs between satellite 18 and the system at the present invention. In one embodiment, a plurality of blanket connectors 25 includes connection pins 27 that secure multiple blankets 10 one to another. The system of invention further includes a plurality of buoys 29 and connections 30 to pneumatic array 15. As generally known and understood, buoy 29 is utilized to moor the connected blankets of the present invention and maintain a position at or near the water surface in which the system is deployed.

A user will calculate the desired size of a particular system to be deployed. When the user is operating a fish farm, this particular area might have more definiteness than a user desiring to deploy the system in the open sea. But, even in the open sea, the water that approaches 79.7 degrees Fahrenheit should be covered.

Even in the open sea, a user will be able to calculate a desired square footage of coverage and assemble a plurality of blankets into a system of desired size and configuration.

As will generally be understood, the system is deployed in the open sea by a user on an appropriate boat. As the user begins to deploy individual climate blankets they are inflated once they are put on the water. They are secured one to the other and each is inflated as desired. The user will attach buoy 29 as desired. In one embodiment, a buoy 29 will be attached to edges and corners of the system. In one environment, each buoy 29 is constructed and arranged with a light, a sound generating device, an electronic position location device or combinations thereof. It is contemplated in one embodiment of the invention that the buoy 29 will have a proximity sensor and emit light, sound, or an electronic signal to alert when the boat is coming within a fix proximity of buoy 29.

The communication system of the present invention includes a user interface configured for interacting with existing climate and weather measurement systems. There is an enormity of climate and weather data publicly available throughout the world. The present invention contemplates utilizing existing measurement devices and systems in order to provide information relating to deploy of the system of the present invention.

The user interface is one or more microprocessor based devices that are located either at or near a desired spot for the deploy of the system, and, can include a remote user having access we are by the remote user can't communicate with a boat at sea relating to positioning of the system of the present invention.

The impetus of user interface is to gather climate, weather, positioning data, or combinations thereof, and provide an output to a user relating to desired positioning of the system of the presentation as well as providing data relating to and affect the system of the present mention is providing as demonstrated by measurements obtained from existing climate and weather data systems. In one embodiment, an operator having a user interface located remote from the boat carrying the system of the presentation can communicate with persons on the boat and provide weather, climate, and positioning information in order to determine a desire location for deploy upper system the present invention. Additionally, either a remote user accessing a user interface or a user on a boat accessing the user interface can determine the number of blankets to be deployed based on analysis of the climate, weather, and positioning information received and analyzed.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

What is claimed:

1. A deployable climate blanket system for regulating temperature of a water surface, comprising:

two or more climate blankets, said blankets comprising a main body; a plurality of weights permanently attached to said main body; an interior cavity constructed and arranged to receive and hold air, wherein said main body is accessed through at least one hose configured to fill air into said interior cavity and to expel air from said interior cavity as desired; a plurality of connectors positioned about the perimeter of each of said climate blankets;

a buoy attached to said climate blankets with the at least one hose in order to moor and adjustably maintain the climate blankets on or below a water surface in which said climate blankets are deployed;

a communications system configured for receiving information from weather and positioning systems about environmental conditions of the water surface and including at least one of surface water temperature, air temperature, localized climate, geographic position, or combinations thereof, said communications system further configured for output communications of said information to a user; and a user device comprising a user interface and a microprocessor configured to receive said output information from said communications system and further processing said output information to provide data relating to an effect of said blankets on the temperature of said water surface in which said blanket system is deployed.

2. The system of claim 1 wherein said blankets have an upper surface and lower surface, wherein said lower surface is facing the bottom of a body of water onto which said system is deployed.

3. The system of claim 1 wherein said blankets have an upper surface and lower surface, wherein said lower surface is facing the bottom of a body of water onto which said system is deployed and said weights are affixed to said bottom surface.

4. The system of claim 1 wherein said interior cavity includes a fill valve.

5. The system of claim 1 wherein said interior cavity includes a fill valve configured to fill or expel air from said cavity as selected by a user.

6. The system of claim 1 wherein said plurality of connectors includes two connectors on each edge of said blankets.

7. The system of claim 1 wherein said plurality of connectors includes a connector pin configured for securing connectors of different blankets one to another.

8. The system of claim 1 wherein said buoy includes at least two buoys.

9. A deployable climate blanket system for regulating temperature of a water surface, consisting of:

two or more climate blankets, said blankets comprising a main body; a plurality of weights permanently attached to said main body; an interior cavity constructed and arranged to receive and hold air, wherein said main body is accessed through at least one hose configured to fill air into said interior cavity and to expel air from said interior cavity as desired; a plurality of connectors positioned about the perimeter of each of said climate blankets;

a buoy attached to said climate blankets with the at least one hose in order to moor and adjustably maintain the climate blankets on or below a water surface in which said climate blankets are deployed;

a communications system configured for receiving information from weather and positioning systems about environmental conditions of the water surface and including at least one of surface water temperature, air temperature, localized climate, geographic position, or combinations thereof, said communications system further configured for output communications of said information to a user; and a user device comprising a user interface and a microprocessor configured to receive said output information from said communications system and further processing said output information to provide data relating to an effect of said blankets on the temperature of said water surface in which said blanket system is deployed.

10. The system of claim 9 wherein said blankets have an upper surface and lower surface, wherein said lower surface is facing the bottom of a body of water onto which said system is deployed.

11. The system of claim 9 wherein said blankets have an upper surface and lower surface, wherein said lower surface is facing the bottom of a body of water onto which said system is deployed and said weights are affixed to said bottom surface.

12. The system of claim 9 wherein said interior cavity includes a fill valve.

13. The system of claim 9 wherein said interior cavity includes a fill valve configured to fill or expel air from said cavity as selected by a user.

14. The system of claim 9 wherein said plurality of connectors includes two connectors on each edge of said blankets.

15. The system of claim 9 wherein said plurality of connectors includes a connector pin configured for securing connectors of different blankets one to another.

16. The system of claim 9 wherein said buoy includes at least two buoys.

* * * * *